(12) United States Patent
Edlinger

(10) Patent No.: US 6,186,081 B1
(45) Date of Patent: *Feb. 13, 2001

(54) PROCESS AND APPARATUS FOR TREATING WASTE AND SEWAGE SLUDGE

(75) Inventor: Alfred Edlinger, Baden (CH)

(73) Assignee: "Holderbank"Financiere Glarus AG, Glarus (CH)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/065,038

(22) PCT Filed: Aug. 6, 1997

(86) PCT No.: PCT/AT97/00183
§ 371 Date: Apr. 27, 1998
§ 102(e) Date: Apr. 27, 1998

(87) PCT Pub. No.: WO98/08984
PCT Pub. Date: Mar. 5, 1998

(30) Foreign Application Priority Data

Aug. 27, 1996 (AU) .................................. A1528/96

(51) Int. Cl.$^7$ ................. F23B 7/00; F23G 5/02; F23J 15/00
(52) U.S. Cl. .......................... 110/342; 110/345; 110/203; 110/215; 110/220; 110/229; 110/250
(58) Field of Search .................. 110/210, 211, 110/219, 220, 229, 235, 243, 246, 250, 252, 255, 259, 342, 344, 345, 346, 347, 348, 203, 204, 208, 212, 214, 215, 216, 233

(56) References Cited

U.S. PATENT DOCUMENTS 4,206,186 * 6/1980 Holter et al. .................. 110/242 X
4,485,745 * 12/1984 Bracker et al. ................ 110/233 X (List continued on next page.)

FOREIGN PATENT DOCUMENTS

| 2 304 369 | 5/1974 | (DE) . |
| 31 48 550 A1 | 4/1983 | (DE) . |
| 43 06 207 | 9/1994 | (DE) . |
| 024 637 | 3/1981 | (EP) . |
| 096 212 A2 | 12/1983 | (EP) . |
| 208 881 A1 | 1/1987 | (EP) . |

Primary Examiner—Carl D. Price
Assistant Examiner—Ljiljana V. Ciric
(74) Attorney, Agent, or Firm—Pillsbury Madison & Sutro LLP

(57) ABSTRACT

Waste (such as domestic garbage, industrial waste, and bulky refuse) or sewage sludge is pretreated by pyrolysis under an oxygen-poor atmosphere to provide solid pyrolysis residues and a pyrolysis gas. The solid pyrolysis residues are mechanically treated to provide a coarse fraction and a fine fraction. The coarse fraction is mechanically separated and fed to a metal bath reactor containing a metal bath and a liquid slag floating on the metal bath. The fine fraction entrained in a carrier gas is fed via a nozzle in order to carburize the metal bath. The carburized metal bath functions to reduce metal oxides from the liquid slag floated thereon, thereby purifying the liquid slag. At least a portion of the pyrolysis gas is used to smelt and heat the liquid slag.

12 Claims, 2 Drawing Sheets

U.S. PATENT DOCUMENTS

| | | | | |
|---|---|---|---|---|
| 4,708,641 | * | 11/1987 | Meininger | 110/215 X |
| 4,750,437 | * | 6/1988 | Rouse | 110/220 X |
| 4,878,440 | * | 11/1989 | Tratz et al. . | |
| 4,890,563 | * | 1/1990 | White et al. | 110/344 X |
| 4,977,837 | * | 12/1990 | Roos et al. | 110/220 X |
| 5,027,722 | * | 7/1991 | Schwyter | 110/344 X |
| 5,133,267 | * | 7/1992 | Kent et al. | 110/215 X |
| 5,190,672 | * | 3/1993 | Coenen et al. | 110/215 X |
| 5,237,940 | * | 8/1993 | Pieper et al. . | |
| 5,259,863 | * | 11/1993 | Schneider et al. | 110/216 X |
| 5,288,969 | * | 2/1994 | Wong et al. | 110/250 X |
| 5,347,938 | * | 9/1994 | Takazawa | 110/346 |
| 5,451,738 | * | 9/1995 | Alvi et al. | 110/250 X |
| 5,477,790 | * | 12/1995 | Foldyna et al. | 110/229 X |
| 5,505,144 | * | 4/1996 | Doron et al. | 110/229 X |
| 5,537,940 | * | 7/1996 | Nagel et al. | 110/346 |
| 5,584,255 | * | 12/1996 | Bishop et al. | 110/346 X |
| 5,592,888 | * | 1/1997 | Berwein et al. | 110/211 X |
| 5,657,706 | * | 8/1997 | Liagre et al. | 110/250 |
| 5,765,489 | * | 6/1998 | Hugentobler et al. | 110/250 X |
| 5,925,165 | * | 7/1999 | Pflugl et al. . | |

* cited by examiner

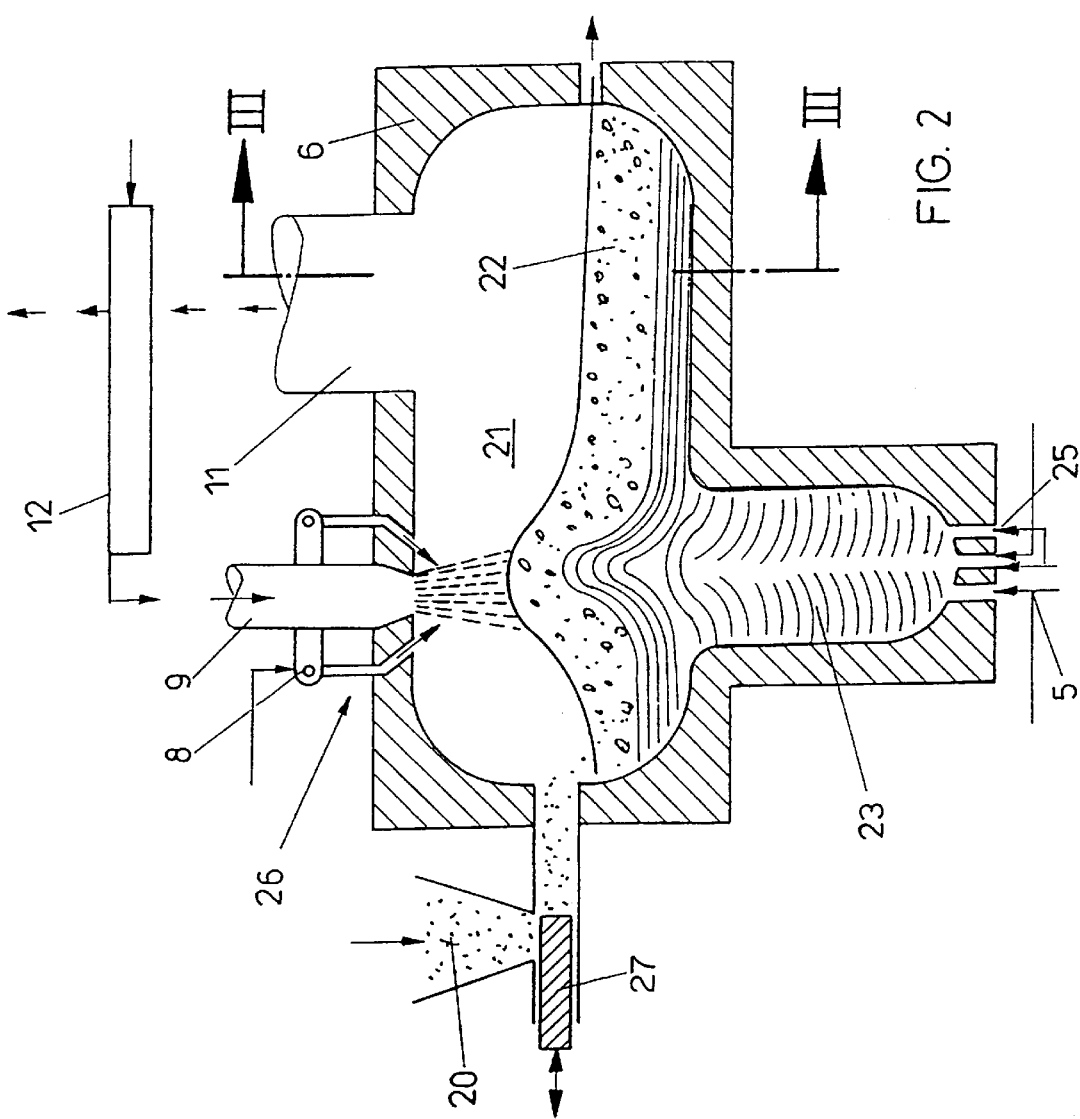

PROCESS AND APPARATUS FOR TREATING WASTE AND SEWAGE SLUDGE

BACKGROUND OF THE INVENTION

1. Field of the Invention

The invention relates to a process for working up waste such as, e.g., residual waste from domestic garbage, industrial waste, bulky refuse or sewage sludge, in which the waste or the sewage sludge is subjected to pyrolysis under an oxygen-poor atmosphere and the solids are subjected to mechanical treating and screening. The invention also relates to an arrangement for carrying out said process.

2. Description of the Related Art

For working up waste it has already been suggested to subject waste comprised of domestic garbage, industrial waste similar to domestic garbage, bulky refuse and sewage sludge to pyrolysis in a first process step. After such a pyrolysis, which was carried out at temperatures of below 500° C. and, most frequently, at temperatures of approximately 450° C. under oxygen-deficient conditions, in known processes cooling to temperatures of below 150° C. was, for instance, realized by means of a cooling vibration conveyor, whereupon a coarse fraction and a fine fraction were formed in a screening means. In the course of that conversion or carbonization at low temperatures, it could be determined that the coarse fraction primarily contained ferritic metals, nonferrous metals and inert material such as, e.g., glass, ceramics, stones and porcelain, whereas the fine fraction contained almost all of the carbon from the waste charged. The fine fraction having grain sizes of above 1 mm in known processes was comminuted and subjected to high-temperature combustion along with the low temperature carbonization gas. Due to the elevated carbon concentration in the fine fraction, a fuel having a high calorific value was provided. Subsequent high-temperature combustion was used to produce energy and, in particular, to produce electric energy or long-distance energy. This high temperature combustion produced an ash melt or slag which could be granulated to a vitrified slag granulate material in a water bath.

Furthermore, it has already been suggested, following the pyrolysis of residual waste, to carry out an extensive chemical reduction in a first step, whereupon oxidation was conducted in several steps in order to be able to discharge valuable substances and, in particular, metal fractions separately.

SUMMARY OF THE INVENTION

The invention aims at further developing a process of the initially defined kind with a view to enabling the formation of slag fractions free of heavy metals and, in particular, free of chromium while enhancing energy utilization such that the slag fractions may be directly used as a cement grinding additive or pozzolanic starting material and the metallic portions can be recovered in a better way.

To solve these objects, the process according to the invention essentially resides in that a screened coarse fraction mechanically separated from metals is charged into a metal bath reactor, a screened fine fraction is charged via a nozzle into the metal bath by means of a carrier gas in order to carburize the metal bath and the pyrolysis gas is used at least partially as a combustion gas for smelting and heating the slag bath floating on the metal bath. By providing a metal bath reactor immediately downstream to the conversion or low temperature carbonization effected in a pyrolysis reactor, the fractions occurring separately after screening can be used in a manner so as to allow for the quantitative separation of heavy metals and nonferrous heavy metals from the mineral phases. By charging via a nozzle the screened fine fraction into the metal bath by aid of a carrier gas, the metal bath can be carburized in a suitable manner. Such a carburized metal bath subsequently is reacted with the molten slag fraction or the molten solids from pyrolysis, whereby metallic portions from that slag fraction are reduced into the metal bath and a slag product free of heavy metals and nonferrous heavy metals is obtained. Due to the high calorific value of the low temperature carbonization gas, or pyrolysis gas, the latter may be used for smelting and heating the slag bath floating on the metal bath, thereby achieving a high efficiency without additional energy introduction. Purer end products are thus obtained without additional energy supply. The process stands out for its high economy. At the same time, a high-quality pozzolan is produced for the cement industry. Due to the reduction of metallic portions taking place in the metal bath reactor, even problematic substances such as, for instance, galvanization sludges, sewage sludges and car shredder light fractions may be employed without contamination of the end product such that altogether pure end products are formed. Metallic portions can be discharged with the metal bath and subsequently worked up separately.

Advantageously, the process according to the invention is carried out in a manner that an inert gas and, in particular, nitrogen is used as a carrier gas for charging via nozzles the fine fraction into the metal bath.

Mechanical processing enables a considerable portion of the metallic fraction to be separated after pyrolysis and after cooling of the pyrolysis coke using, for instance, magnetic separators, wherein the high carbon portion of the fine fraction, which optionally has been additionally disintegrated by means of a roll type crusher, allows for direct injection into the iron bath reactor. In order to safely keep the desired reduction potential of the metal bath and to burn excess carbon in the bath, it is advantageously proceeded in a manner that oxygen or air is blown into the metal bath via cooled tuyeres and, in particular, such oxygen or air is enveloped by hydrocarbons. By adjusting the respective amounts of fine fraction and oxygen blown in, the reduction potential of the metal bath required for the quantitative reduction of metallic portions in the slag bath may be adjusted within desired limits.

Advantageously, an iron bath is charged as the metal bath. Particularly efficient combustion of the pyrolysis gas formed during pyrolysis is feasible if, corresponding to a preferred further development of the process according to the invention, the pyrolysis gases are burnt with hot air and/or oxygen by means of burners opening into the reactor space above the slag bath. In that case, conventional burners may be employed, to which hot air or oxygen is fed through a central channel and the pyrolysis gases are fed via an annular channel.

The hot offgas formed during the gasification of the carbon contained in the metal and during the combustion of the pyrolysis gas (which is used for melting the slags) also contains chemical energy. Advantageously, such metal bath reactor offgases are used for preheating the hot combustion gases for burning the pyrolysis gas, to which end the process is carried out in a manner that the hot combustion gases is heated by the metal bath reactor offgases.

The overall process, including waste pretreatment, runs exothermally, i.e., at an excess of energy such that quite a considerable amount of pyrolysis gases may, for instance, be converted into electric energy. Further energy utilization of the energy generated by the cooled metal bath reactor offgases (hereinafter referred to as energetic utilization) advantageously may be realized by burning a portion of the pyrolysis gases with the cooled metal bath reactor offgases leaving the recuperative heat exchanger, and with air. The combustion offgases after energy utilization are subjected to offgas purification, to which end these gases are burnt in a further combustion chamber under air supply. Following energy utilization, which naturally may also reside in producing long-distance energy, conventional smoke gas purification takes place, wherein the process advantageously is carried out such that dusts and, in particular, filter dusts are withdrawn from offgas purification and subjected to basic (alkaline) washing, whereupon the hydroxide sludges formed are charged onto the slag bath of the metal bath reactor. Closing of the recirculatory system in order to safely dispose of problematic substances as they are formed in offgas purification has, thus, become feasible also in this respect.

In order to ensure the desired interfacial reaction between molten metal bath and liquid slag to proceed quickly and uniformly, it is advantageous to safeguard a minimum height of the metal bath so as to avoid sparging caused by the blowing in of pyrolysis coke and oxygen, as well as excessive turbulence. To this end, the process advantageously is carried out in a manner that the metal bath of the metal bath reactor is continuously discharged via a channel-type overflow, thereby being simultaneously able to adjust the desired metal bath height. The alloy drawn off contains any metallic portions not yet separated by mechanical pre-separation and may be further fractionated and worked up in a known manner.

The arrangement according to the invention for carrying out this process essentially is characterized by a pyrolysis drum, a cooling means for the solids, a screening means and a metal bath reactor comprising submerged or bottom tuyeres opening into the metal bath for introducing the fine fraction of the screening means and feeding air or oxygen. Burners opening into the gas space of the metal bath reactor are arranged for the pyrolysis gas and an overflow channel is connected to the metal bath for discharging molten metal at a substantially constant height of the metal bath. Advantageously, this arrangement may be further developed in a manner that a granulator and, in particular, a vapor granulator is arranged to follow the molten slag discharge means for the production of a pozzolanic granulate material, whereby a highly pure and completely vitrified pozzolanic granulate material is immediately formed.

In the following, the invention will be explained in more detail by way of an exemplary embodiment and by way of the drawing.

BRIEF DESCRIPTION OF THE DRAWINGS

The arrangement provided according to the invention is explained in more detail in the drawings, wherein FIG. 2 is a sectional view taken along the iron bath reactor, and FIG. 3 is a sectional view taken along line III—III of FIG. 2.

DESCRIPTION OF THE INVENTION

Figure 1:
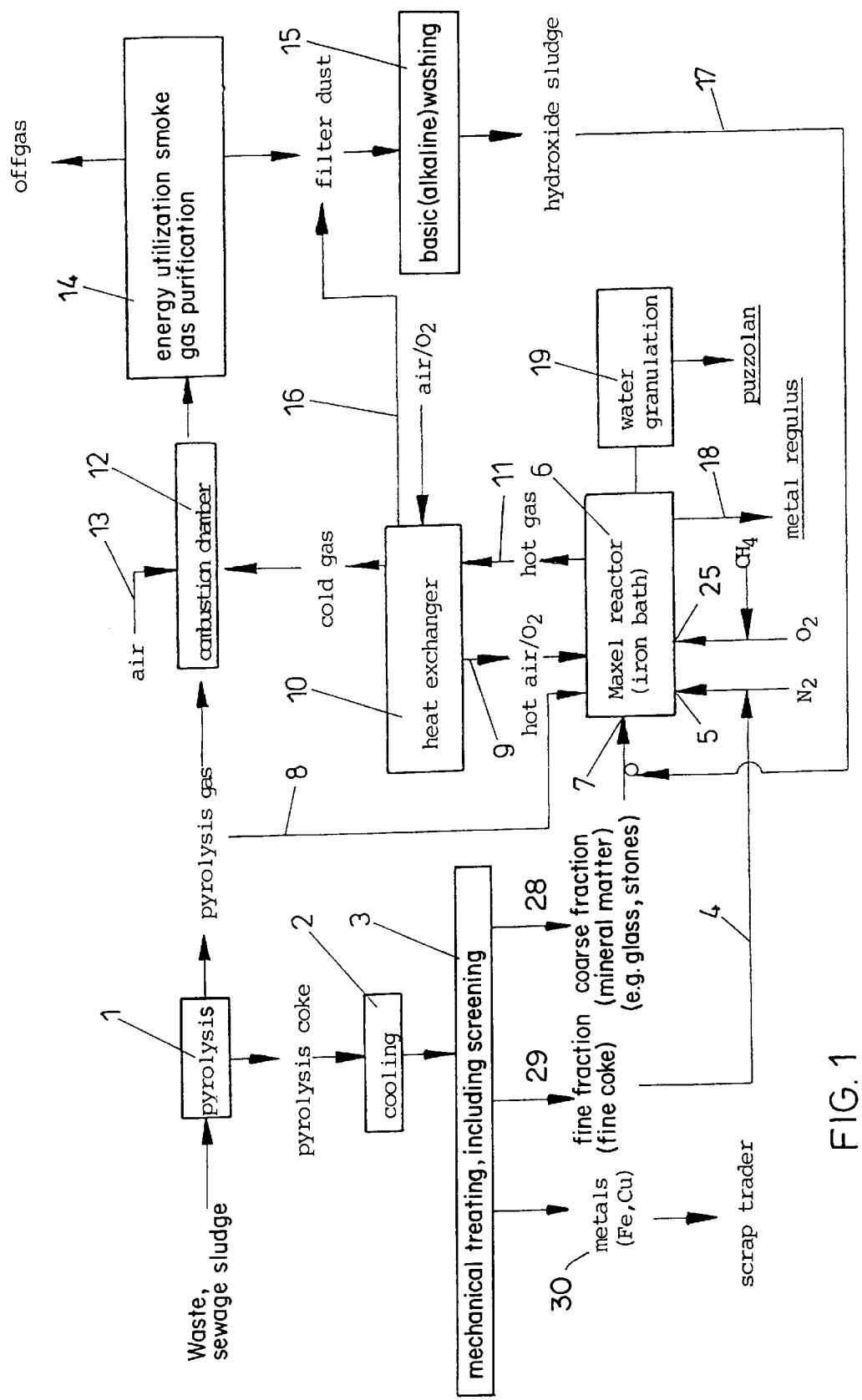
FIG. 1 is a process flow chart.

One ton of domestic garbage was subjected to pyrolysis at 450° C., thereby forming 650 kg of pyrolysis gas and 350 kg of solid pyrolysis residues. The thus formed solid pyrolysis after cooling were subjected to mechanical treating or screening, thereby separating 32 kg of metal, 55 kg of coal dust and 263 kg of mineral portions. Subsequently, the coal dust was blown into a metal bath with 3 kg of nitrogen, the mineral fraction having been charged onto this metal bath. A partial amount of the pyrolysis gas, i.e., 35 kg, was burnt by hot blast air in the gas space of the metal bath reactor. In addition, 73 kg oxygen enveloped by 8 kg of methane were introduced via nozzles into the metal bath.

The metal bath reactor offgas formed in an amount of 130 kg and, in addition to CO, $CO_2$, $H_2$ and $H_2O$, still contained residual amounts of zinc and lead. This hot gas was conducted through a regenerative heat exchanger, thereby preheating the combustion air for the combustion of the pyrolysis gas. After this, further combustion of this hot gas along with the residual amount of the pyrolysis gas was effected in a combustion chamber to produce electric energy.

The filter dust produced in the subsequent purification of smoke gas was subjected to basic washing with the hydroxide sludges, and then returned to, and charged into, the iron bath reactor together with the mineral fraction from mechanical treatment.

16 kg of alloy and 247 kg of a highly pure pozzolanic product were drawn off the iron bath reactor, the pozzolan formed having the following chemical analysis:

| Component | Portion (%) |
|---|---|
| $SiO_2$ | 57 |
| CaO | 15 |
| $Al_2O_3$ | 17 |
| $Na_2O$ | 4 |
| $K_2O$ | 3 |
| MgO | 2 |

The liquid-pozzolanic slag melt formed occurred at temperatures of about 1430° C. and was subsequently granulated in a water bath flow at a slag/water ratio of about 10 in the thin slag stream. In this connection, the application of vapor jet granulation has proved to be of particular advantage, since extremely high cooling speeds are attained while greatly reducing water consumption. The pozzolan formed was completely vitrified and may readily substitute up to 35% by weight of clinker in cement.

The thus formed cements stand out for their extremely high ultimate strengths and low production of hydration heat. Such cements are, thus, particularly suitable for mass concretes used, for instance, for masonry dams, tunnels or foundations. The cement-technological values were obtained as follows:

| | | |
|---|---|---|
| Strength activity index (ASTM 311-90) | = | 118% (after 28 days) |
| Keil index ($R_{50}$ + 8 – 10%) | = | 89% (after 28 days) |
| Keil index ($R_{60}$ + 8 – 10%) | = | 62% (after 7 days) |

The strengths required for the concrete grade B25/35 could be readily met. Thus, strengths already are 48.4 $N/mm^2$ after 28 days (drilling core test).

The metal regulus formed, or alloy discharged, had the following composition:

| Metal | Portion (%) |
|---|---|
| Fe | 75 |
| P | 14 |
| Cr | 2 |
| Mn | 3 |
| Ni | 1 |
| Cu | 4 |

Such an alloy may, for instance, be worked up by fractionated oxidation, wherein also the recovery of highly enriched chromium slag for the formation of ferrochromium is practically feasible.

As is apparent from the process flow chart according to FIG. 1, domestic garbage is subjected to pyrolysis, such as in pyrolysis drum 1, in which the charged garbage, which optionally may also contain sewage sludge and galvanization sludge, was pyrolyzed at temperatures of about 450° C. under oxygen-deficient conditions. The pyrolysis coke drawn off was subjected to cooling 2, whereupon mechanical treating 3 was effected. By mechanical treating, which also included screening, metals 30 such as iron and copper could be pre-separated. The fine coke 29 formed, together with nitrogen, may be pneumatically introduced via a nozzle into an iron bath of an iron bath reactor 6 through bottom tuyeres 5 via a duct 4. Through further bottom tuyeres 25, oxygen enveloped by hydrocarbon may be introduced into the metal bath.

The coarser fraction 28 contains all mineral portions such as, for instance, glass and stones and is charged into the iron bath reactor 6 via a hopper and charging means 7.

A portion of the pyrolysis gas leaving pyrolysis is burnt together with hot air in the gas space of the iron bath reactor 6 by means of a burner 26. The pyrolysis gas is fed through duct 8 and hot air is fed through duct 9. Before that, the hot air was preheated in a regenerative heat exchanger 10, the regenerative heat exchanger being preheated by the hot iron bath reactor offgas drawn off the reactor 6 via a duct 11.

This hot iron bath reactor offgas after cooling is supplied to a combustion chamber 12 in which the hot iron bath reactor offgas is burnt together with the major portion of the pyrolysis gas while supplying air through duct 13. After energy utilization schematically indicated at 14, smoke gas purification of the filter dust is conducted by basic washing 15. Also, air preheated by means of the regenerative heat exchanger 10, via a duct 16, may be used to pneumatically convey the filter dust. The hydroxide sludge formed is returned via duct 17 to the charging means 7 for processing with the mineral fraction from mechanical treatment 3.

A metal regulus is discharged from the iron bath reactor 6 via a tap 18. The slag is subsequently discharged through an exit port (see FIG. 2) and processed to vitrified pozzolanic granulate material in a water granulation means 19.

As may be taken from FIGS. 2 and 3, a structurally simple metal bath reactor may be employed. The iron bath reactor is again denoted by 6.

The mineral portion from a hopper 20 reaches the reactor space via a ram 27, the gas space being denoted by 21. The pyrolysis gas is burnt with hot air by means of annular burners and causes the solids to smelt, thus forming a liquid slag (also referred to herein as a slag bath) 22. The iron bath of the iron bath reactor is denoted by 23. Through the bottom tuyere 5, the appropriately disintegrated pyrolysis coke is blown into the iron bath reactor 23. Nitrogen, methane and oxygen are additionally blown in through bottom tuyeres 25.

As is apparent from FIG. 3, continuous tapping of the alloy is effected via a metal siphon 24 while simultaneously keeping the height of the iron bath constant.

On the whole, excellent purification of the differently occurring starting materials charged for pyrolysis is provided at a low structural expenditure and high energy utilization, thus forming valuable substances as well as products for immediate industrial use, the exothermic process rendering feasible a high degree of energy recovery.

What is claimed is:

1. A process for treating sewage sludge or waste, said process comprising:

subjecting the sewage sludge or waste to pyrolysis under an oxygen-poor atmosphere to provide solid pyrolysis residues and a pyrolysis gas;

mechanically treating the solid pyrolysis residues to separate a coarse fraction and a fine fraction, the coarse fraction including metal oxides;

feeding the coarse fraction into a liquid slag contained in a metal bath reactor, the metal bath reactor also containing a metal bath on which the liquid slag floats;

entraining the fine fraction in a carrier gas and introducing the entrained fine fraction and the carrier gas via a nozzle into the metal bath contained in the metal bath reactor in order to carburize the metal bath;

reacting the carburized metal bath with the liquid slag to reduce the metal oxides of the coarse fraction contained in the liquid slag; and smelting and heating the liquid slag with at least a portion of the pyrolysis gas.

2. The process of claim 1, wherein said mechanical treating includes screening.

3. The process of claim 1, wherein the carrier gas comprises an inert gas.

4. The process of claim 3, wherein the inert gas comprises nitrogen.

5. The process of claim 1, further comprising blowing oxygen or air into the metal bath via tuyeres.

6. The process of claim 1, wherein the metal bath is an iron bath.

7. The process of claim 1, further comprising:

feeding hot combustion gas into the metal bath reactor; and burning the pyrolysis gas with the hot combustion gas via burners opening into a space within the metal bath reactor, the space being positioned above the liquid slag, wherein the hot combustion gas comprises at least one member selected from the group consisting of air and oxygen.

8. The process of claim 1, further comprising cooling offgases discharged from the metal bath reactor in a heat exchanger, burning a portion of the pyrolysis gas with the cooled offgases and air to form combustion offgases, then subjecting the combustion offgases to purification.

9. The process of claim 8, wherein said subjecting of the combustion offgases to purification comprises:

withdrawing filter dusts from the combustion offgases, the filter dusts being derived from the solid pyrolysis residues;

washing the filter dusts under alkaline conditions to form a hydroxide sludge; and feeding the hydroxide sludge into the liquid slag in the metal bath reactor.

10. The process of claim 1, further comprising continuously discharging the metal bath from the metal bath reactor.

11. A process for treating sewage sludge or waste, said process comprising:

subjecting the sewage sludge or waste to pyrolysis under an oxygen-poor atmosphere to provide solid pyrolysis residues and a pyrolysis gas;

mechanically treating the solid pyrolysis residues to separate a coarse fraction and a fine fraction;

feeding the coarse fraction into a liquid slag contained in a metal bath reactor, the metal bath reactor also containing a metal bath on which the liquid slag floats;

entraining the fine fraction in a carrier gas and introducing the entrained fine fraction and the carrier gas via a nozzle into the metal bath contained in the metal bath reactor in order to carburize the metal bath; and blowing oxygen or air into the metal bath via tuyeres;

smelting and heating the liquid slats with at least a portion of the pyrolysis gas, wherein the oxygen or air is enveloped by hydrocarbons.

12. A process for treating sewage sludge or waste, said process comprising:

subjecting the sewage sludge or waste to pyrolysis under an oxygen-poor atmosphere to provide solid pyrolysis residues and a pyrolysis gas;

mechanically treating the solid pyrolysis residues to separate a coarse fraction and a fine fraction;

feeding the coarse fraction into a liquid slag contained in a metal bath reactor, the metal bath reactor also containing a metal bath on which the liquid slag floats;

entraining the fine fraction in a carrier gas and introducing the entrained fine fraction and the carrier gas via a nozzle into the metal bath contained in the metal bath reactor in order to carburize the metal bath;

discharging offgases from the metal bath reactor and heating a combustion gas with the discharged offgases to form hot combustion gas;

feeding the hot combustion gas and the pyrolysis gas into the metal bath reactor and burning the pyrolysis gas with the hot combustion gas via burners opening into a space within the metal bath reactor, the space being positioned above the liquid slag and the hot combustion gases comprising at least one member selected from the group consisting of air and oxygen; and smelting and heating the liquid slag with at least a portion of the pyrolysis gas.

\* \* \* \* \*